United States Patent
Feng et al.

(10) Patent No.: US 10,732,319 B2
(45) Date of Patent: Aug. 4, 2020

(54) FORECASTING SOLAR POWER OUTPUT

(71) Applicant: INTERNATIONAL BUSINESS MACHINES CORPORATION, Armonk, NY (US)

(72) Inventors: Minwei Feng, Yorktown Heights, NY (US); Ildar Khabibrakhmanov, Syosset, NY (US); Tarun Kumar, Mohegan Lake, NY (US); Mark A. Lavin, Katonah, NY (US); Kevin W. Warren, Hopewell Junction, NY (US); Rui Zhang, Chappaqua, NY (US); Wei Zhang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 15/690,312

(22) Filed: Aug. 30, 2017

(65) Prior Publication Data

US 2019/0064392 A1    Feb. 28, 2019

(51) Int. Cl.
*G01W 1/10*    (2006.01)
*H02J 3/38*    (2006.01)
*G06Q 50/06*    (2012.01)
*G05B 13/02*    (2006.01)
*G06F 17/18*    (2006.01)
(Continued)

(52) U.S. Cl.
CPC .......... *G01W 1/10* (2013.01); *G05B 13/0265* (2013.01); *G06F 17/18* (2013.01); *G06N 3/0445* (2013.01); *G06N 3/0454* (2013.01); *G06N 3/0481* (2013.01); *G06N 3/08* (2013.01);
(Continued)

(58) Field of Classification Search
CPC ...................................................... G01W 1/10
See application file for complete search history.

(56) References Cited

U.S. PATENT DOCUMENTS

| 7,542,852 B1 | 6/2009 | Rose et al. |
| 8,346,702 B2 | 1/2013 | Busch et al. |
| (Continued) | | |

FOREIGN PATENT DOCUMENTS

| CN | 104616078 A | 5/2015 |
| WO | 2016210102 A1 | 12/2016 |
| WO | 2017035629 A1 | 3/2017 |

OTHER PUBLICATIONS

Wang et al. "Integrating decision tree with back propagation network to conduct business diagnosis and performance simulation for solar companies", Elsevier 2015, journal homepage: www.elsevier.com/locate/dss, pp. 1-8.

(Continued)

*Primary Examiner* — Raymond L Nimox
(74) *Attorney, Agent, or Firm* — Kristofer L. Haggerty

(57) ABSTRACT

A method, computer system, and computer program product. Weather forecast data is generated with respect to an area encompassing a location of a solar farm by a computer system. Solar power output by the solar farm is forecasted by the computer system based on the generated weather forecast data. Forecasted solar power output data is generated by the computer system based on the forecasted solar power output by the solar farm. A power grid operation, including one or both of a power grid balancing operation and a power grid optimization operation, is performed based on the forecasted solar power output data.

17 Claims, 5 Drawing Sheets

(51) Int. Cl.
  G06N 20/00 (2019.01)
  G06N 3/04 (2006.01)
  G06N 3/08 (2006.01)
  G06N 20/10 (2019.01)
(52) U.S. Cl.
  CPC ............. *G06N 20/00* (2019.01); *G06N 20/10* (2019.01); *G06Q 50/06* (2013.01); *H02J 3/383* (2013.01)

(56) References Cited

U.S. PATENT DOCUMENTS

| | | | |
|---|---|---|---|
| 9,471,884 | B2 | 10/2016 | Hamann et al. |
| 10,331,089 | B2* | 6/2019 | Khabibrakhmanov et al. ............. G01W 1/10 |
| 2010/0198420 | A1* | 8/2010 | Rettger .................. G01W 1/10 700/291 |
| 2010/0204844 | A1* | 8/2010 | Rettger .................... H02J 3/06 700/291 |
| 2011/0307109 | A1* | 12/2011 | Sri-Jayantha .......... G06Q 50/06 700/291 |
| 2013/0013206 | A1 | 1/2013 | Guha et al. |
| 2014/0324350 | A1 | 10/2014 | Hamann et al. |
| 2015/0153714 | A1 | 6/2015 | Ho |
| 2016/0223600 | A1 | 8/2016 | Wang et al. |
| 2017/0017732 | A1 | 1/2017 | Hamann et al. |
| 2017/0031867 | A1 | 2/2017 | Yuan et al. |
| 2017/0286838 | A1* | 10/2017 | Cipriani ................. G06N 20/00 |
| 2018/0218254 | A1* | 8/2018 | Feng ...................... G01W 1/10 |
| 2018/0248380 | A1* | 8/2018 | Khabibrakhmanov . H02J 3/383 |
| 2018/0275314 | A1* | 9/2018 | Pavlovski ............... G01W 1/10 |

OTHER PUBLICATIONS

Elfelly et al., "A multimodel approach of complex systems identification and control using neural and fuzzy clustering algorithms", 2010 Ninth International Conference on Machine Learning and Applications, 2010 IEEE, pp. 1-6.
Mell et al., "The NIST Definition of Cloud Computing", NIST, Sep. 2011, 7 Pages, Special Publication 800-145, U.S. Department of Commerce, Gaithersburg, MD.
Quest, "Introduction to Boosting Trees for Regression and Classification", Printed on Aug. 10, 2017, 22 Pages, https://support.quest.com/technical-documents/statistics/current/textbook, Copyright 2017 Quest Software Inc., United States.
Sharma et al., "Predicting Solar Generation from Weather Forecasts Using Machine Learning", 2011 IEEE International Conference on Smart Grid Communications (SmartGridComm), Oct. 17-20, 2011, pp. 528-533, IEEE, Brussels, Belgium.
Pelland et al., "Photovoltaic and Solar Forecasting: State of the Art", The IEA Photovoltaic Power Systems Programme (IEA-PVPS), Oct. 2013, 40 Pages, The International Energy Agency (IEA), Brussels, Belgium.
Mori et al., "Distance Measures for Time Series in R: The TSdist Package", The R Journal, Dec. 2016, 9 Pages, Contributed Research Articles, vol. 8/2, Spain.
IBM, "Deep Thunder", Printed on Aug. 25, 2017, 3 Pages, IBM Corporation, http://www-03.ibm.com/ibm/history/ibm100/us/en/icons/deepthunder/.
Krizhevsky et al., "ImageNet Classification with Deep Convolutional Neural Networks", Communications of the ACM, Jun. 2017, pp. 84-90, ACM, vol. 60, Issue 6.
He et al., "Deep Residual Learning for Image Recognition", 2015, 12 Pages, CoRR, Dec. 10, 2015, hp://arvix.org/abs/1512.03385.
Srivastava et al., "Unsupervised Learning of Video Representations Using LSTMs", Proceedings of the 32nd International Conference on Machine Learning, Jan. 4, 2016, pp. 843-852, ICML, Toronto, Canada.
Frentzos et al., "Index-based Most Similar Trajectory Search", IEEE 23 International Conference on Data Engineering, Apr. 15-20, 2007, pp. 816-825, IEEE, Istanbul, Turkey.

Keogh et al., "Exact Indexing of Dynamic Time Warping", Knowledge and Information Systems, Mar. 1, 2005, pp. 358-386, vol. 7, Issue 3, Springer-Verlag London Ltd.
Brandmaier, "pdc: An R Package for Complexity-Based Clustering of Time Series", Journal of Statistical Software, Oct. 2015, 23 Pages, vol. 67, Issue 5, The Foundation for Open Access Statistics.
Gaidon et al., "A Time Series Kernel for Action Recognition", Brittish Machine Vision Conference (BMVC 2011), Aug. 2011, pp. 63.1-63.11, BMVA press, Dundee, United Kingdom.
Geurts, "Contributions to Decision Tree Induction: Bias/Variance Tradeoff and Time Series Classification", Universite de Liege, Faculte des Sciences Appliquees, Institute d'electricite Montefiore, 2001-2002, 260 Pages.
Chen et al., "On the Marriage of Lp-norms and Edit Distance", Proceedings of the Thirtieth International Conference on Very Large Databases, Aug. 31, 2004-Sep. 3, 2004, pp. 792-803, vol. 30, Toronto, Canada.
Montero et al., "TSclust: An R Package for Time Series Clustering", Journal of Statistical Software, Nov. 2014, 43 Pages, vol. 62, Issue 1, The American Statistical Association.
Giorgino, "Computing and Visualizing Dynamic Time Warping Alignments in R: The dtw Package", Journal of Statistical Software, Aug. 2009, 24 Pages, vol. 31, Issue 7, The American Statistical Association.
Chouakria et al., "Adaptive dissimilarity index for measuring time series proximity", Advances in Data Analysis and Classification, Mar. 2007, pp. 5-21, vol. 1, Issue 1, Springer-Verlag.
Genolini et al., "KmL: k-means for longitudinal data", Computational Statistics, Jun. 2010, pp. 317-328, vol. 25, Issue 2, Springer-Verlag.
Golay et al., "A new correlation-based fuzzy logic clustering algorithm for FMRI", Magnetic Resonance in Medicine, Aug. 1998, pp. 249-260, ResearchGate.
Kalpakis et al., "Distance Measures for Effective Clustering of ARIMA Time-Series", Proceedings of the 2001 IEEE International Conference on Data Mining, Nov. 29, 2001-Dec. 2, 2001, pp. 273-280, IEEE Computer Society.
Galeano et al., "Multivariate Analysis in Vector Time Series", The Journal of the Institute of Mathematics and Statistics of the University of Sao Paolo, 2000, pp. 383-403, vol. 4, Resenhas.
Batista et al., "A Complexity-Invariant Distance Measure for Time Series", Proceedings of the Eleventh SIAM International Conference on Data Mining, SDM 2011, Apr. 28-30, 2011, pp. 699-710, SIAM.
Moller-Levet et al., "Fuzzy Clustering of Short Time-Series and Unevenly Distributed Sampling Points", 5th International Symposium on Intelligent Data Analysis (IDA 2003), Aug. 2003, pp. 330-340, Springer-Verlag, Berlin, Germany.
Aßfalg et al., "Similarity Search on Time Series based on Threshold Queries", 10th International Conference on Extending Database Technology (EDBT 2006), Mar. 26-31, 2006, pp. 276-294, Springer-Verlag, Berlin, Germany.
Rani et al., "Recent Techniques of Clustering of Time Series Data: A Survey", International Journal of Computer Applications, Aug. 2012, 9 Pages, vol. 52, No. 15.
Cilibrasi et al., "Clustering by Compression", IEEE Transactions on Information Theory, Apr. 5, 2005, 28 Pages, vol. 51, Issue 4, IEEE.
Chen et al., "Robust and Fast Similarity Search for Moving Object Trajectories", International Conference on Management of Data (SIGMOD 2005), Jun. 14-16, 2005, pp. 491-502, ACM, New York, NY.
Vlachos et al., "Discovering Similar Multidimensional Trajectories", 18th International Conference on Data Engineering, Feb. 26-Mar. 1, 2002, pp. 673-684, IEEE, San Jose, California.
Pree et al., "On general purpose time series similarity measures and their use as kernel functions in support vector machines", Information Sciences, May 28, 2014, pp. 478-495, Elsevier Inc.
Piccolo, "A Distance Measure for Classifying ARIMA Models", Journal of Time Series Analysis, Jun. 2008, 13 Pages, vol. 11, No. 2.

(56) References Cited

OTHER PUBLICATIONS

Liao, "Clustering of Time Series Data—a Survey", The Journal of the Pattern Recognition Society, Pattern Recognition, Nov. 1, 2005, pp. 1857-1874, vol. 38, Issue 11, Elsevier Science Inc., New York, NY.
U.S. Appl. No. 15/288,707, entitled "Forecasting Solar Power Generation Using Real-Time Power Data", filed Oct. 7, 2016, pp. 1-40.
U.S. Appl. No. 15/445,218, entitled "Forecasting Solar Power Generation Using Real-Time Power Data", filed Feb. 28, 2017, pp. 1-42.
U.S. Appl. No. 15/422,972, entitled "Solar Power Forecasting With Volumetric Convolutional Neural Network", filed Feb. 2, 2017, pp. 1-53.
U.S. Appl. No. 15/288,571, entitled "Forecasting Solar Power Generation Using Weather Forecasts", filed Oct. 7, 2016, pp. 1-34.

\* cited by examiner

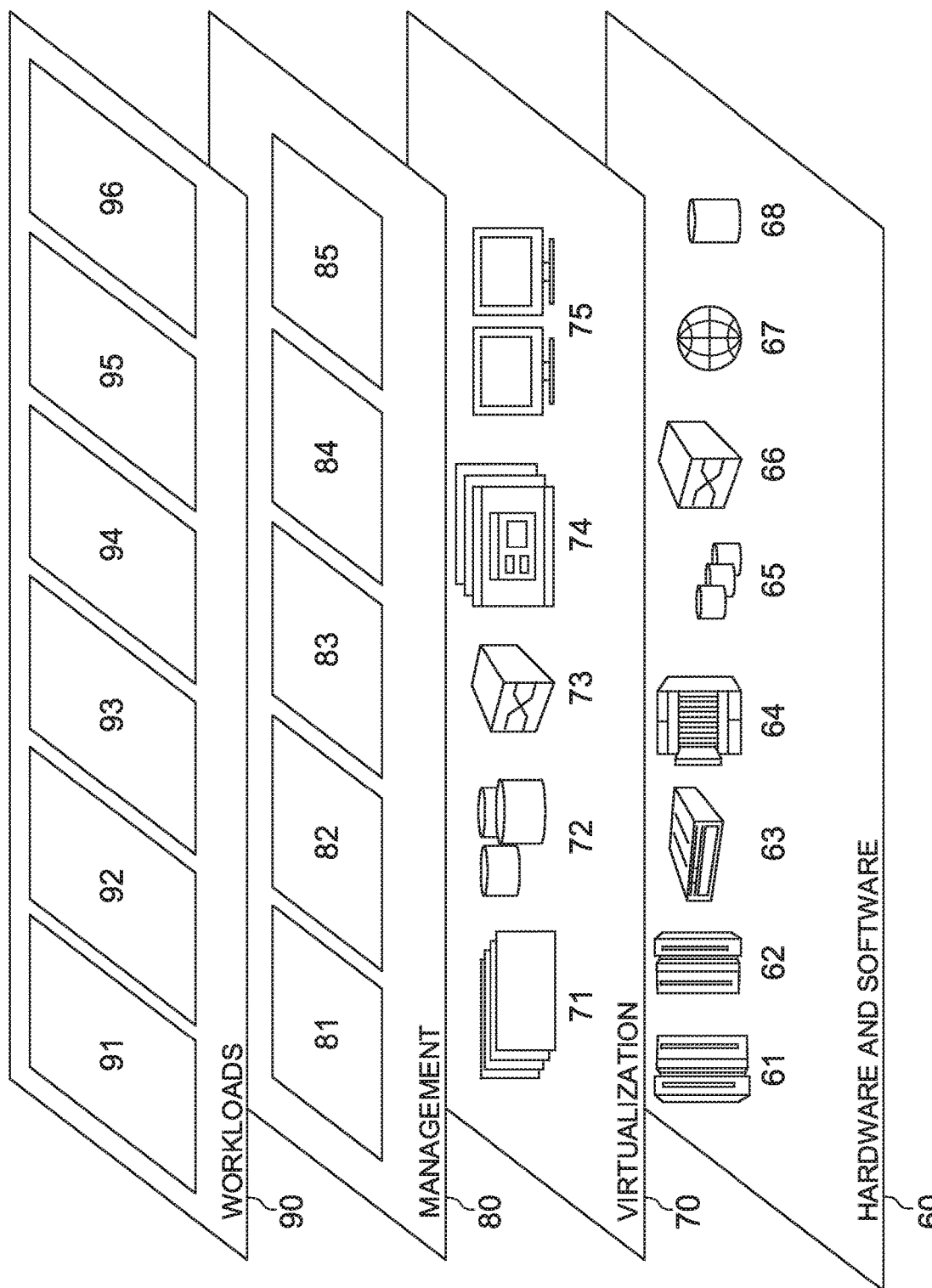

FORECASTING SOLAR POWER OUTPUT

BACKGROUND

The present invention relates generally to forecasting models, and more particularly to forecasting solar power output.

Of the various forms of renewable energy resources available today, solar power is considered to be one of the most promising alternatives to fossil fuel. Solar power usage at both the commercial and residential scales has been increasing at an exponential rate over recent years. However, the stochastic nature of solar power poses challenges with respect to its integration into power grid operations.

SUMMARY

Aspects of the present invention are directed to a method, system, and computer program product.

According to an aspect of the present invention, a method is provided. The method may include generating weather forecast data with respect to an area encompassing a location of a solar farm. Solar power output by the solar farm may then be forecasted based on the generated weather forecast data. Forecasted solar power output data may then be generated based on the forecasted solar power output by the solar farm. A power grid operation may then be performed based on the forecasted solar power output data, where the power grid operation is one of a power grid balancing operation and a power grid optimization operation.

According to an aspect of the present invention, a computer system is provided. The computer system may include one or more computer processors, one or more computer-readable storage media, and program instructions stored on one or more of the computer-readable storage media for execution by at least one of the one or more computer processors. The program instructions may be executed to perform the disclosed method.

According to an aspect of the present invention, a computer program product is provided. The computer program product may include one or more computer-readable storage devices and program instructions stored on at least one of the one or more computer-readable storage devices for execution by at least one or more computer processors of a computer system. The program instructions may be executed by the at least one or more computer processors of the computer system to perform the disclosed method.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

FIG. 5 depicts abstraction model layers, in accordance with an embodiment of the present invention.

The Figures are not necessarily to scale. The Figures are merely schematic representations, not intended to portray specific parameters of the invention. The Figures are intended to depict only typical embodiments of the invention. In the Figures, like numbering represents like elements.

DETAILED DESCRIPTION

Figure 1:
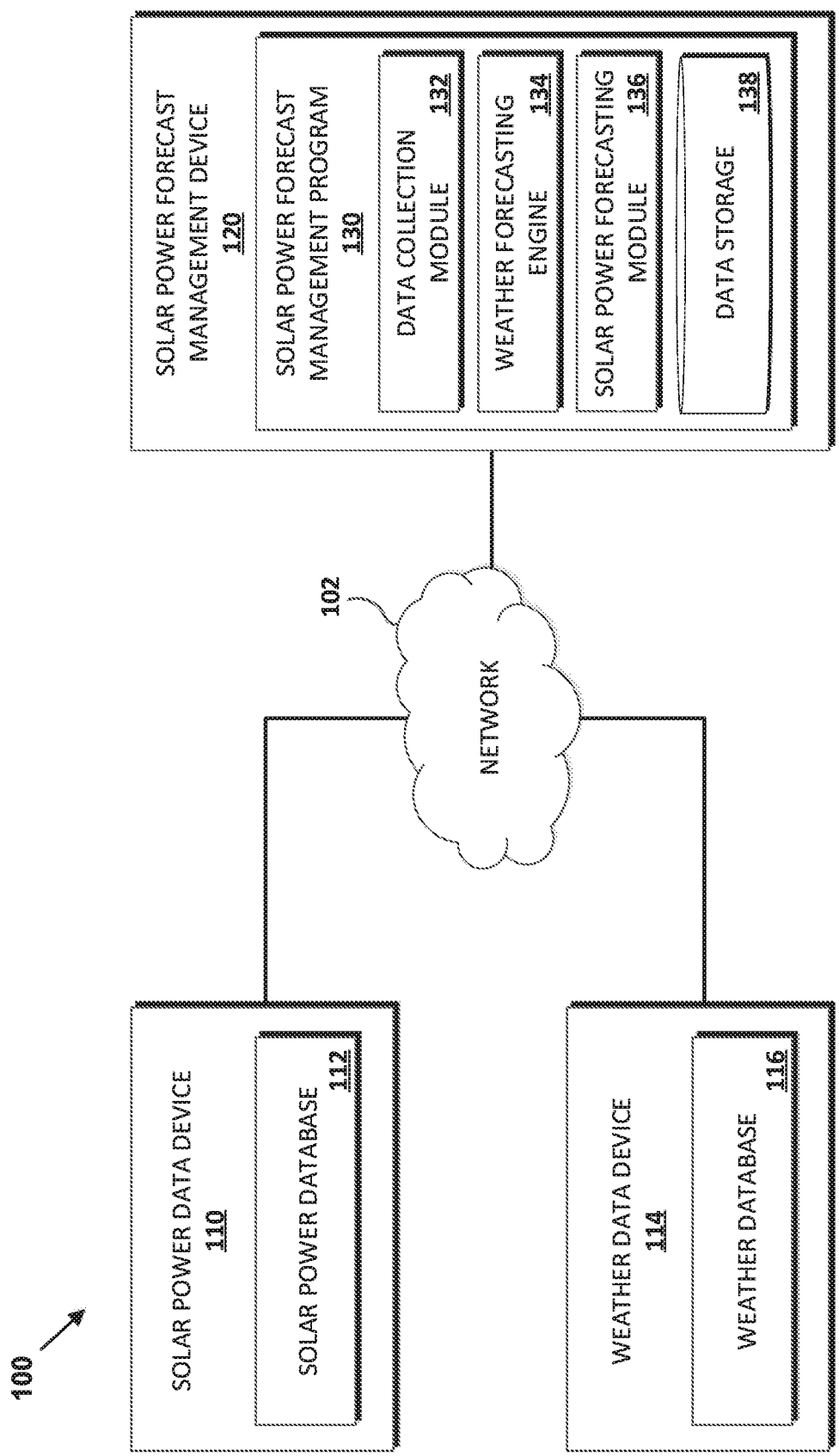
FIG. 1 is a functional block diagram depicting a solar power forecast system, in accordance with an embodiment of the present invention.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment", "an embodiment", "an example embodiment", or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

Forecasted solar power output information enables planned integration of solar power into power grid operations, such as with respect to power grid balancing, power grid optimization, and solar power trading. Forecasting the solar power output requires forecasting various physical variables based on conditions such as sun positions, meteorological conditions, atmospheric conditions, weather conditions, and the like. It also requires estimating amounts of solar power photovoltaic power plants, or solar farms, may generate and subsequently output, given forecasted amounts of meteorological resources. The amounts of solar power generated by particular solar farms may depend, among other things, upon the characteristics of the solar panels used at the farms. The amounts of solar power output by the solar farms may depend, among other things, upon the characteristics of the power inverters used in converting generated DC solar power to output AC solar power. The power inverters may also be used in regulating the output AC solar power that may be delivered to a power grid. The amounts of solar power generated and the amounts of solar power output by a particular solar farm may not necessarily be equal.

Embodiments of the present invention are directed to a system and method for forecasting solar power output. Solar power data and historical weather data are received. Weather data is forecasted. Ideal solar power output and similarity measures, based on the solar power data and the historical weather data, may be determined. The solar power output is forecasted based on the forecasted weather data, and optionally, the determined similarity measures in addition. Forecasted solar power output data may be generated for use in controlling and optimizing power grid operations with respect to the forecasted solar power output.

Advantageously, forecasted solar power output according to the present disclosure provides a significant accuracy boost of more than 3% over that of conventional techniques with respect to actual solar power output, allowing for a potential cost-savings of billions of US Dollars over time. To that end, embodiments of the present invention have the capacity to improve the technical field of solar power output forecasting, thereby enabling more efficient functionality, operation, and utilization of electrical power grids with respect to solar power. Data representative of the forecasted solar power output may be used to, for example, effectively plan for, and control integration of, output solar power into power grid operations, such as with respect to power grid balancing, power grid optimization, and solar power trading.

FIG. 1 is a functional block diagram depicting solar power forecast system 100, in accordance with an embodiment of the present invention. Solar power forecast system 100 may include solar power data device 110, weather data device 114, and solar power forecast management device 120, interconnected by way of network 102. While FIG. 1 depicts three discrete devices in solar power forecast system 100, other arrangements may be contemplated, for example, solar power data device 110, weather data device 114, and solar power forecast management device 120 may form one or more integrated devices.

In various embodiments of the present invention, network 102 represents an intranet, a local area network (LAN), or a wide area network (WAN) such as the Internet, and may include wired, wireless, or fiber optic connections. In general, network 102 may be any combination of connections and protocols that may support communications between solar power data device 110, weather data device 114, and solar power forecast management device 120, in accordance with embodiments of the present invention. In the various embodiments, network 102 may be the Internet, representative of a worldwide collection of networks and gateways that may support communications between devices connected to the Internet.

In various embodiments of the present invention, solar power data device 110, weather data device 114, and solar power forecast management device 120 represent individual computing platforms such as a laptop computer, a desktop computer, or a computer server. In the various embodiments, solar power data device 110, weather data device 114, or solar power forecast management device 120 may otherwise be any other type of computing platform, computing system, or information system capable of receiving and sending data to and from another device, by way of network 102. Solar power data device 110, weather data device 114, or solar power forecast management device 120 may include internal and external hardware components, as depicted and described with reference to FIG. 3. In other embodiments, solar power data device 110, weather data device 114, or solar power forecast management device 120 may be implemented in a cloud computing environment, as depicted and described with reference to FIGS. 4 and 5.

Solar power data device 110 and weather data device 114 each represent a computing platform that may respectively host one or more database management systems, such as solar power database 112 and weather database 116. Solar power database 112 and weather database 116 may each respectively be a program, one or more subroutines contained in a program, an application programming interface, or the like, that communicates with solar power forecast management program 130 residing on solar power forecast management device 120. In various embodiments of the present invention, solar power database 112 and weather database 116 may each include and respectively implement a combination of devices and technologies, such as network devices and corresponding device drivers, to provide a platform to enable respective communication between solar power data device 110 or weather data device 114, and solar power forecast management program 130.

Solar power database 112 represents a database management system that may host solar power data and information relating to amounts of generated and output solar power by a solar farm. Solar power database 112 may serve as a source of data and information that may be data mined. In an embodiment of the present invention, the solar power data may include, for example, solar power generation data and solar power output data of the solar farm, based on amounts of generated and output solar power by the solar farm, respectively. In the embodiment, the solar power data may include, for example, hourly solar power data, daily solar power data, monthly solar power data, and the like. In the embodiment, the solar power data may include historical solar power data.

Weather database 116 represents a database management system that may host weather data and information relating to meteorological conditions, atmospheric conditions, weather conditions, and the like. Weather database 116 may serve as a source of information that may be data mined. In an embodiment of the present invention, the weather data may include, for example, historical and current weather data.

Solar power forecast management device 120 represents a computing platform that may host one or more software programs, such as solar power forecast management program 130. Solar power forecast management program 130 may include data collection module 132, weather forecasting engine 134, solar power forecasting module 136, and data storage 138. Solar power forecast management program 130 may be a program, one or more subroutines contained in a program, an application programming interface, or the like, that communicates with solar power database 112 and weather database 116, residing on solar power data device 110 and weather data device 114, respectively.

Data collection module 132 represents functionality of solar power forecast management program 130 that communicates with solar power database 112 and weather database 116 to receive solar power data and weather data, respectively. Data collection module 132 may use one or more data crawlers, data miners, or other programs and methods, to periodically run database queries to receive the data. Data collection module 132 subsequently stores the received data in data storage 138, for later retrieval and use by solar power forecast management program 130. The received data may be stored in the form of, for example, separate computer-readable data files.

Weather forecasting engine 134 represents functionality of solar power forecast management program 130 that generates weather forecast data. In an embodiment of the present invention, weather forecasting engine 134 may utilize a weather forecasting system that uses various numerical weather prediction techniques to generate the weather forecast data. In the embodiment, the weather forecasting system may include, for example, the Deep Thunder™ weather forecasting system ("the weather forecasting system"), developed by IBM of Armonk, N.Y. The weather forecasting system may employ the Advanced Research Core of the Weather Research and Forecasting model. The weather forecasting system may be used to make predictions regarding various physical variables based on conditions such as those that may affect the transfer of heat or thermal energy in and about an area encompassing a location of the solar farm. The various physical variables may also include those based on conditions that may affect the propagation of solar radiation in and about the area. In the embodiment, the area may range in size from tens of square meters to thousands of square kilometers.

Solar power forecasting module 136 represents functionality of solar power forecast management program 130 that forecasts actual solar power output by the solar farm. In an embodiment of the present invention, solar power forecasting module 136 may utilize a deep learning model based on a volumetric convolution neural network to forecast the solar power output. In the embodiment, the deep learning model may further be based on a recurrent neural network. The deep learning model may be used for tasks relating to image or video classification and action recognition, where the learning task may be applied to sequences of images or videos forming the four dimensional tensor data, as described in further detail below.

The neural networks may be similar to those described in "ImageNet Classification with Deep Convolutional Neural Networks," and "Deep Residual Learning for Image Recognition," which are both incorporated herein by reference. In the embodiment, the volumetric convolution neural network and the recurrent neural network may use a volumetric convolution neural network layer in lieu of a spatial convolution neural network layer. In the embodiment, the deep learning model may be used to, for example, learn and associate relationships between the spatial and temporal evolution of weather conditions, and corresponding effects on solar power output. In the embodiment, the relationships between the spatial and temporal evolution of the weather conditions may be modeled by, for example, spatio-temporal features based on the weather data.

Figure 2:
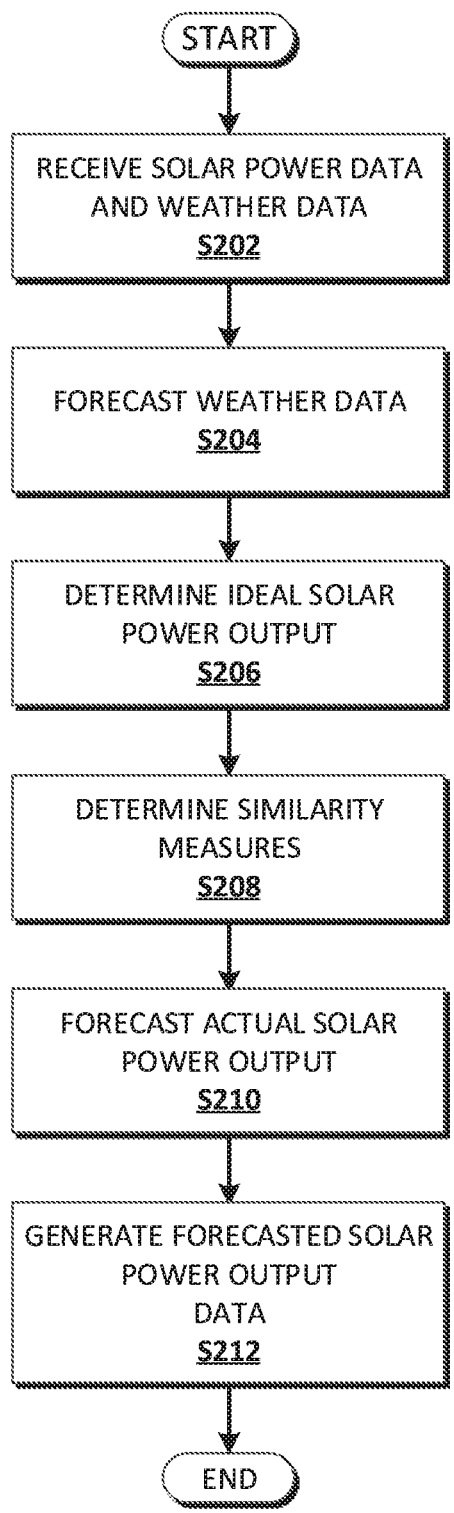
FIG. 2 is a flowchart depicting operational steps of an aspect of solar power forecast system, in accordance with an embodiment of the present invention.

FIG. 2 is a flowchart depicting operational steps of an aspect of solar power forecast system 100, in accordance with an embodiment of the present invention.

At step S202, data collection module 132 receives the solar power data and the weather data from solar power database 112 and weather database 116, respectively.

At step S204, weather forecasting engine 134 generates the weather forecast data utilizing the weather forecasting system. The weather forecast data may be generated by way of atmospheric models defined by governing equations that include boundary conditions based on observed weather conditions in and about the area encompassing the location of the solar farm. The atmospheric models may be used to make predictions regarding physical variables based on conditions in and about the area. In an embodiment of the present invention, the generated weather forecast data may include data relating to the physical variables. The predicted physical variables may include, for example, those based on conditions such as incident solar irradiance, temperature, humidity, pressure, moisture, wind velocity, cloud coverage, visibility, precipitation type and intensity, aerosol concentrations, and the like.

In an embodiment of the present invention, the atmospheric models may respectively be defined in terms of four dimensional grids. In the embodiment, the grids may include dimensions relating to, for example, time, longitude, latitude, and altitude. A temporal resolution may be, for example, 10 minutes. A spatial resolution may be, for example, 1 km. In the embodiment, each grid point may be defined in terms of the physical variables, for which respective values or magnitudes may be computed with respect to forecasted time points. In the embodiment, a size of each of the four dimensional grids, with respect to time, longitude, latitude, and altitude, may be, for example, 6 time intervals× 258 km×172 km×50 km, respectively. In the embodiment, the physical variables may be computed with respect to a geo-spatial area having a size of, for example, 44,000 km$^2$. The appropriate choice of the size of each of the four dimensional grids may be a matter of design, based on, for example, a given application at-hand. For example, the size of each of the four dimensional grids may be chosen to correspond to a size of the solar farm.

In an embodiment of the present invention, four dimensional tensor data may be derived from the generated weather forecast data. In the embodiment, the four dimensional tensor data may be input to solar power forecasting module 136, for use in forecasting solar power output. For the task of forecasting solar power output, the physical variable relating to incident solar irradiance in and about the area of the solar farm is of particular interest. Other of the physical variables of interest include those that may affect a magnitude of the incident solar irradiance in and about the solar farm. In the embodiment, each four dimensional tensor may be defined in terms of, for example, time, the physical variables, longitude, and latitude. The physical variables may include those that may be altitude-sensitive, which may have an effect on the incident solar irradiance in and about the area. In the embodiment, the physical variables of each of the four dimensional tensors may include, for example, incident solar irradiance, temperature, humidity, pressure, moisture, wind velocity, cloud coverage, precipitation type and intensity, aerosol concentrations, and the like. In the embodiment, each of the four dimensional tensors may be used to forecast an hourly solar power output by the solar farm. In the embodiment, a size of each four dimensional tensor, with respect to time, the physical variables, longitude, and latitude, may be, for example, 6 time intervals×17 physical variables×258 km×172 km, respectively. The appropriate choice of the size of each four dimensional tensor may be chosen as a matter of design choice, based, for example, on a given application at-hand. In the embodiment, the 17 physical variables may include, for example, those listed in Table 1:

TABLE 1

Table 3: The weather features generated by the weather forecast model.

| Feature | description | unit |
|---|---|---|
| SWDDNI | Shortwave surface downward direct normal irradiance | W/m$^2$ |
| SWDDIR | Shortwave surface downward direct irradiance | W/m$^2$ |
| SWDDIF | Shortwave surface downward diffuse irradiance | W/m$^2$ |
| SWDOWN | Downward short wave flux at group surface | W/m$^2$ |
| T2 | Temperature at 2M | K |
| VIS | Visibility | m |
| U10 | x component wind velocity at 10 meter | m/s |
| V10 | y component wind velocity at 10 meter | m/s |
| U40 | x component wind velocity at 40 meter | m/s |
| V40 | y component wind velocity at 40 meter | m/s |
| U84 | x component wind velocity at 84 meter | m/s |
| V84 | y component wind velocity at 84 meter | m/s |
| W84 | z component wind velocity at 84 meter | m/s |
| Cosmo | cosmo wind gust | m/s |
| Gust | wind gust | m/s |

TABLE 1-continued

Table 3: The weather features generated by the weather forecast model.

| Feature | description | unit |
| --- | --- | --- |
| NC Gust | NC wind gust | m/s |
| SFC Gust | SFC wind gust | m/s |

At step S206, solar power forecasting module 136 determines ideal solar power output by the solar farm. In an embodiment of the present invention, the determined ideal solar power output may be used to account for differences between amounts of solar power generated by the solar farm, and amounts of solar power output by the solar farm. As used herein, the phrase "ideal solar power output" refers to that which may occur on "ideal days" having ideal conditions that facilitate ideal generation of solar power by the solar farm, thereby facilitating ideal output of solar power by the solar farm in turn. The ideal conditions may include, for example, sunny weather and no cloud coverage. An amount of the ideal solar power output may differ from a corresponding amount of solar power generated by the solar farm, due to power losses caused by power inverters. As a result, the solar power output may be lower than the solar power generated. Another result of the power losses caused by the power inverters includes deviation of any correlation that may exist between the solar power output and sun positions throughout days and months of a year.

In an embodiment of the present invention, the ideal solar power output may be determined on a monthly basis, based on respectively selected days of each month. In the embodiment, the days and months may include historical days and historical months. In the embodiment, the days may include ideal days. The ideal days may be selected relative to other days of the same month. In the embodiment, the ideal solar power output may be determined for a month, based on historical solar power data of the solar farm on an ideal day of the month. In the embodiment, each of the ideal days may be selected where the corresponding historical solar power data for the day exceeds a predetermined threshold value. The appropriate choice of the predetermined threshold value may be a matter of design, based on, for example, a given application at-hand.

In an embodiment of the present invention, hourly solar power output by the solar farm may be computed according to, for example, Equation 1:

$$P^{d,m} = \{p_h^{d,m}, h=0,1,\ldots,23\}$$

where "$P^{d,m}$" is a set of hourly solar power output values for a day, d, of a month, m; and "$p_h^{d,m}$" are the hourly solar power output values of the set, for each hour, h, of the day, d.

In the embodiment, a daily sum of the set of hourly solar power output values may be computed according to, for example, Equation 2:

$$s^{d,m} = \Sigma_h p_h^{d,m}$$

where "$s^{d,m}$" is the daily sum of the set of hourly solar power output values for the day, d, of the month, m.

In the embodiment, a maximum daily sum of the set of hourly solar power output values for a month may be computed according to, for example, Equation 3:

$$S^m = \max(s^{d,m})$$

where $S^m$ is the maximum daily sum of the set of hourly solar power output values for the month, m.

In the embodiment, a daily maximum and a monthly maximum of the hourly solar power output may be respectively computed according to, for example, Equations 4 and 5:

$$m^{d,m} = \max(p_h^{d,m}) \text{ and } M^m = \max(m^{d,m})$$

where $m^{d,m}$ is the daily maximum of the ideal hourly solar power output; and $M^m$ is the monthly maximum of the ideal hourly solar power output.

To summarize, the ideal days should include those days having daily solar power output sums that exceed the predetermined threshold value, and maximum solar power output amounts relative to other days of the same historical month.

In the embodiment, the selected ideal days may include, for example, days having daily sums of hourly solar power output values, as computed according to Equation 2, that exceed the predetermined threshold value. In the embodiment, the selected ideal days may also include, for example, daily maximums of hourly solar power output values, as computed according to Equations 4 and 5, that exceed those of all other days of the same month. In the embodiment, the selected ideal days may also include, for example, hourly solar power output values which exhibit a smooth bell curve when plotted as a function of time. The smooth bell curve may indicate a lack of sudden drops in hourly solar power output by the solar farm per day.

In an embodiment of the present invention, the historically ideal days may be selected by way of, for example, Algorithm 1:

Algorithm 1
Algorithm 1 Algorithm to select ideal days

```
for m ∈ (1,...,13) do
    for d ∈ (1,...,d_m) do
        if s^{d,m} < S^m = 0.9 then
            Not an Ideal day
        else if s^{d,m} < S^m = 0.95 then
            Not an Ideal day
        else
            for h ∈ (5,...,19) do
                if p_h^{d,m} < avg(p_{h-1}^{d,m},p_{h+1}^{d,m}) = 0.9 then
                    Not an Ideal day; break
                else if p_h^{d,m} - avg(p_{h-1}^{d,m},p_{h+1}^{d,m}) < -200 then
                    Not an Ideal day; break
                else
                    An Ideal day
                end if
            end for
        end if
    end for
end for
```

In an embodiment of the present invention, after the ideal days are selected, a linear model may then be fit to each month, for use in mapping and correlating sun positions to the determined ideal solar power output by the solar farm, with respect to each month. In the embodiment, the linear model may be used to account for the deviations in the solar power output and sun positions resulting from the power losses caused by the power inverters. In the embodiment, the linear model may be fit according to, for example, Equation 6:

$$p = \beta \cdot \cos(z) + b$$

where z is the solar zenith angle, measured with respect to positions of the sun. The linear model may be validated by way of taking the covariance of Root Mean Squared Error of the model, with respect to differences between the determined values by the model, and actual values as observed from the environment. In the embodiment, the values may correspond to amounts of solar power output. In the embodiment, the covariance of Root Mean Squared Error may range in value between, for example, 0.02 and 0.04.

At step S208, solar power forecasting module 136 determines similarity measures to use in forecasting the actual solar power output by the solar farm. In an embodiment of the present invention, the similarity measures may be determined based on the determined ideal solar power output, with respect to corresponding actual solar power historically output by the solar farm. The similarity measures may be used to provide a basis for improving solar power forecast accuracy. More particularly, the similarity measures, otherwise referred to as distance measures, may be used to indicate levels of similarity or dissimilarity between time series data sets, such as in the form of the determined ideal solar power output data and the actual solar power output data. The similarity measures may be computed in accordance with known methods for comparing time series data sets, such as those described in "Distance Measures for Time Series in R: The TSdist Package," which is incorporated herein by reference.

In an embodiment of the present invention, the similarity measures may be determined by way of a support vector machine model, and more particularly, by way of a support vector regression model. The support vector regression model may be trained to predict the similarity measures based on training data including historical weather data and precomputed similarity measures corresponding to respective training days. The training days may include historical days. After training, the support vector regression model may learn to recognize various relationships between weather data, the similarity measures, and solar power output by the solar farm. In the embodiment, the trained support vector regression model may determine the similarity measures for use in forecasting solar power output on a particular day, based on statistical weather data derived from forecasted weather data for the particular day.

In an embodiment of the present invention, a capacity normalized Mean Absolute Percentage Error may be computed according to, for example, Equation 7:

$$rMape = \Sigma |p_i - \hat{p}_i| / \max(p)$$

where $\hat{p}_i$ is the determined ideal solar power output and $p_i$ is the actual solar power output.

In an embodiment of the present invention, the trained support vector regression model may determine or select the similarity measures in accordance with, for example, Algorithm 2:

---
Algorithm 2
Algorithm 2 Algorithm to select similarity metrics
---

Let p be the power output
W be the set of weather features
|S | $s_i, i \in 1,...,26$) be the set os similartites
for i ∈ (1,...,26) do
  k := 0; $r_k$ := 0
  for J ∈ (1,...,1) do
    Let $r_j$ be the rMape from p = F (W || S \ $s_j$))
    if $r_j < r_k$ then
      $r_k := r_j$; k := j
    end if
  end for
  S := S \ $s_k$
end for

---

In the embodiment, the capacity normalized Mean Absolute Percentage Error may be used in determining the similarity measures, for use in forecasting the solar power output of the solar farm, as seen in Algorithm 2.

At step S210, solar power forecasting module 136 forecasts actual solar power output by the solar farm. In an embodiment of the present invention, the solar power output may be forecasted based on the determined similarity measures and the generated weather forecast data. In the embodiment, the generated weather forecast data may include the four dimensional tensor data. In the embodiment, the solar power output may otherwise be forecasted based only on the generated weather forecast data.

In an embodiment of the present invention, the deep learning model may include, for example, a single hour deep learning model based on a volumetric convolution neural network, for use in forecasting the hourly solar power output by the solar farm. In the embodiment, the volumetric convolution neural network may include, for example, 5 blocks or layers of volumetric convolution. In the embodiment, each volumetric convolution block may include, for example, a Rectified Linear Units ("ReLU") layer and a max pooling layer. In the embodiment, the single hour model may use the generated four dimensional tensor data of size 6 time intervals×17 physical variables×258 km×172 km, with respect to time, the physical variables, longitude, and latitude, respectively. Each instance of the generated four dimensional tensor data may be used to generate and forecast corresponding hourly solar power output data. The volumetric convolution neural network may apply a four dimensional convolution over the generated four dimensional tensor data, composed of several input planes made up of the 17 physical variables. The four dimensional convolutions may be applied with respect to spatial and temporal dimensions of the data, by applying a convolved three dimensional filter to the data. The applied convolved three dimensional filter may be used to extract spatio-temporally correlated features based on the weather data. The extracted spatio-temporally correlated features may be used to, for example, forecast cloud movement patterns.

The single hour model based on the volumetric convolution neural network may include units at particular positions of the network, for which values may be computed according to, for example, Equation 8:

$$v_{ij}^{txy} = ReLU\left(b_{ij} + \sum_{m} \sum_{r=0}^{R_i-1} \sum_{p=0}^{P_i-1} \sum_{q=0}^{Q_i-1} w_{ijm}^{rpq} v_{(i-1)m}^{(t+r)(x+p)(y+q)}\right)$$

where $v_{ij}^{txy}$ is the value of a unit at position (t, x, y) in the jth feature map and ith layer; ReLU is the Rectified Linear Unit function; $b_{ij}$ is the bias for the jth feature map; m is used to index across the features from the (i−1)th layer; $w_{ijm}^{rpq}$ is the weight for a value at position (r, p, q) of the applied filter for the mth feature; and R, P, and Q are dimensional sizes of the applied filter, with respect to time, height, and width, respectively. A corresponding output layer of the applied filter may respectively be computed according to, for example, Equations 9, 10, and 11:

$$R_{i+1} = \lfloor (R+2 \times padT - R_i)/dT + 1 \rfloor,$$

$$P_{i+1} = \lfloor (P+2 \times padX - P_i)/dX + 1 \rfloor,$$

$$Q_{i+1} = \lfloor (Q+2 \times padY - Q_i)/dY + 1 \rfloor.$$

A shorthand notation may be used to describe layers of the volumetric convolution neural network. The shorthand notation may be defined according to, for example, Table 3:

TABLE 3

VC(l, R, P, Q; dr, dp, dq) indicates a volumetric convolutional layer with l filters of spatial size R × P × Q, applied to the input with stride VC(dr, dp, dq);
MP(R, P, Q; dr, dp, dq) indicates a volumetric max pooling with spatial size R × P × Q, applied to the input with stride VC(dr, dp, dq);
FC(n) is the fully connected layer with n output nodes;
L(n) is the linear layer with n output nodes.

In an embodiment of the present invention, a neural network architecture of the single hour model based on a volumetric convolution neural network may be defined according to, for example, Logical Statement String 1:

Logical Statement String 1

VC(128, 2, 11, 11; 1, 4, 4) → MP(1, 3, 3; 1, 2, 2) →
VC(384, 2, 5, 5; 1, 1, 1) → MP(1, 3, 3; 1, 2, 2) →
VC(768, 2, 3, 3; 1, 1, 1) →
VC(576, 1, 3, 3; 1, 1, 1) →
VC(576, 1, 3, 3; 1, 1, 1) → MP(1, 3, 3; 1, 2, 2) →
FC(1000) → FC(1).

In the embodiment, a ReLU layer may be added right after each volumetric convolution layer, as shown in Table 3 and Logical Statement String 1. In the embodiment, the architecture of the single hour model, defined according to Logical Statement String 1, may be used to determine the solar power output based on only the generated four dimensional tensor data. In the embodiment, the neural network architecture of the single hour model may include, for example, 5 volumetric convolutional layers, 3 volumetric max pooling layers, and 2 fully connected layers, as shown in Logical Statement String 1. The architecture defined according to Logical Statement String 1 may be based, for example, on that described in "ImageNet Classification with Deep Convolutional Neural Networks." In the embodiment, the architecture of the single hour model based on the volumetric convolution neural network, defined according to Logical Statement String 1, may be adapted to determine the solar power output based on the generated four dimensional tensor data and the similarity measures. In the embodiment, the similarity measures may be concatenated with the output of the first fully connected layer, as shown in Logical Statement String 1.

In an embodiment of the present invention, an architecture of the single hour model based on another volumetric convolution neural network may be defined according to, for example, Logical Statement String 2:

Logical Statement String 2

VC(64, 2, 7, 7; 1, 1, 1) → VC(64, 1, 3, 3; 1, 1, 1) →
VC(64, 1, 3, 3; 1, 1, 1) → VC(64, 1, 3, 3; 1, 1, 1) →
VC(64, 1, 3, 3; 1, 1, 1) → MP(1, 3, 3; 1, 2, 2) →
VC(128, 2, 7, 7; 1, 1, 1) → VC(128, 1, 3, 3; 1, 1, 1) →
VC(128, 1, 3, 3; 1, 1, 1) → VC(128, 1, 3, 3; 1, 1, 1) →
VC(128, 1, 3, 3; 1, 1, 1) → MP(1, 3, 3; 1, 2, 2) →
VC(256, 2, 7, 7; 1, 1, 1) → VC(256, 1, 3, 3; 1, 1, 1) →
VC(256, 1, 3, 3; 1, 1, 1) → VC(256, 1, 3, 3; 1, 1, 1) →
VC(256, 1, 3, 3; 1, 1, 1) → MP(1, 3, 3; 1, 2, 2) →
VC(512, 2, 7, 7; 1, 1, 1) → VC(512, 1, 3, 3; 1, 1, 1) →
VC(512, 1, 3, 3; 1, 1, 1) → VC(512, 1, 3, 3; 1, 1, 1) →

-continued

Logical Statement String 2

VC(512, 1, 3, 3; 1, 1, 1) → MP(1, 3, 3; 1, 2, 2) →
FC(1000) → FC(1).

In the embodiment, a ReLU layer may be added right after each volumetric convolution layer, as shown in Table 3 and Logical Statement String 2. In the embodiment, the architecture of the single hour model based on the neural network defined according to Logical Statement String 2 may include, for example, identity skip connections between layers. The architecture defined according to Logical Statement String 2 may be based, for example, on that described in "Deep Residual Learning for Image Recognition." In the embodiment, the neural network architecture of the single hour model may include, for example, 20 volumetric convolutional layers, 4 volumetric max pooling layers, and 2 fully connected layers, as shown in Logical Statement String 2.

In an embodiment of the present invention, the deep learning model may include, for example, a daily model based on a volumetric convolution neural network. Similar to the single hour model, the daily model may include 5 blocks of volumetric convolution, as shown in Logical Statement String 1. In the embodiment, the daily model may use generated four dimensional tensor data of size 96 time intervals×17 physical variables×258 km×172 km, with respect to time, the physical variables, longitude, and latitude, respectively. In the embodiment, the 96 time intervals may represent, for example, 16 hours of sunlight time in a day. In the embodiment, an architecture of the daily model based on yet another volumetric convolution neural network may be defined according to, for example, Logical Statement String 3:

Logical Statement String 3

VC(128, 2, 11, 11; 1, 4, 4) → MP(1, 3, 3; 1, 2, 2) →
VC(384, 2, 5, 5; 1, 1, 1) → MP(1, 3, 3; 1, 2, 2) →
VC(768, 2, 3, 3; 1, 1, 1) →
VC(576, 1, 3, 3; 1, 1, 1) →
VC(576, 1, 3, 3; 1, 1, 1) → MP(1, 3, 3; 1, 2, 2) →
FC(1000) → FC(16).

As shown, Logical Statement String 3 may resemble Logical Statement String 1, with the main difference being that the last fully connected layer of the architecture of Logical Statement String 3 may map to a vector of size 16, and not 1. In the embodiment, the neural network architecture of the daily model may include, for example, 5 volumetric convolutional layers, 3 volumetric max pooling layers, and 2 fully connected layers, as shown in Logical Statement String 3. The architecture defined according to Logical Statement String 3 may be based, for example, on that described in "ImageNet Classification with Deep Convolutional Neural Networks."

In an embodiment of the present invention, the deep learning model may include, for example, a hybrid daily model based on a volumetric convolution neural network. The hybrid daily model may include an architecture based on that defined according to Logical Statement String 1. In the embodiment, the hybrid daily model may use 16 discrete instances of generated four dimensional tensor data as input. In the embodiment, the 16 tensors may each be of size 6 time intervals×17 physical variables×258 km×172 km, with respect to time, the physical variables, longitude, and latitude, respectively. In the embodiment, the 16 tensors may be input to the architecture based on that defined according to Logical Statement String 1, to generate 16 corresponding embedded representations thereof. In the embodiment, the 16 embedded representations may subsequently be input to a recurrent neural network. In the embodiment, the recurrent neural network may be applied by way of, for example, a Long Short Term Memory ("LSTM") encoder, and LSTM decoder. The encoder and decoder may be used for the task of action recognition in video and next frame prediction. In the embodiment, the recurrent neural network may generate 16 output vectors, each respectively corresponding to the 16 embedded representations. In the embodiment, a fully connected layer may be used at the end to map each output vector to a corresponding score.

At step S212, solar power forecasting module 136 generates forecasted solar power output data based on the forecasted actual solar power output by the solar farm. The forecasted solar power output data may represent the forecasted actual solar power output. In an embodiment of the present invention, the forecasted solar power output data may be generated for use in, for example, controlling and optimizing power grid operations, to enable effective integration of the forecasted solar power output into a power grid. In the embodiment, the control and optimization may be implemented, for example, by a power grid operation input to a control system of the power grid. Utilization of the forecasted solar power output may thereby be enhanced. In the embodiment, the power grid operations may include, for example, power grid balancing operations, power grid optimization operations, and solar power trading operations.

Figure 3:
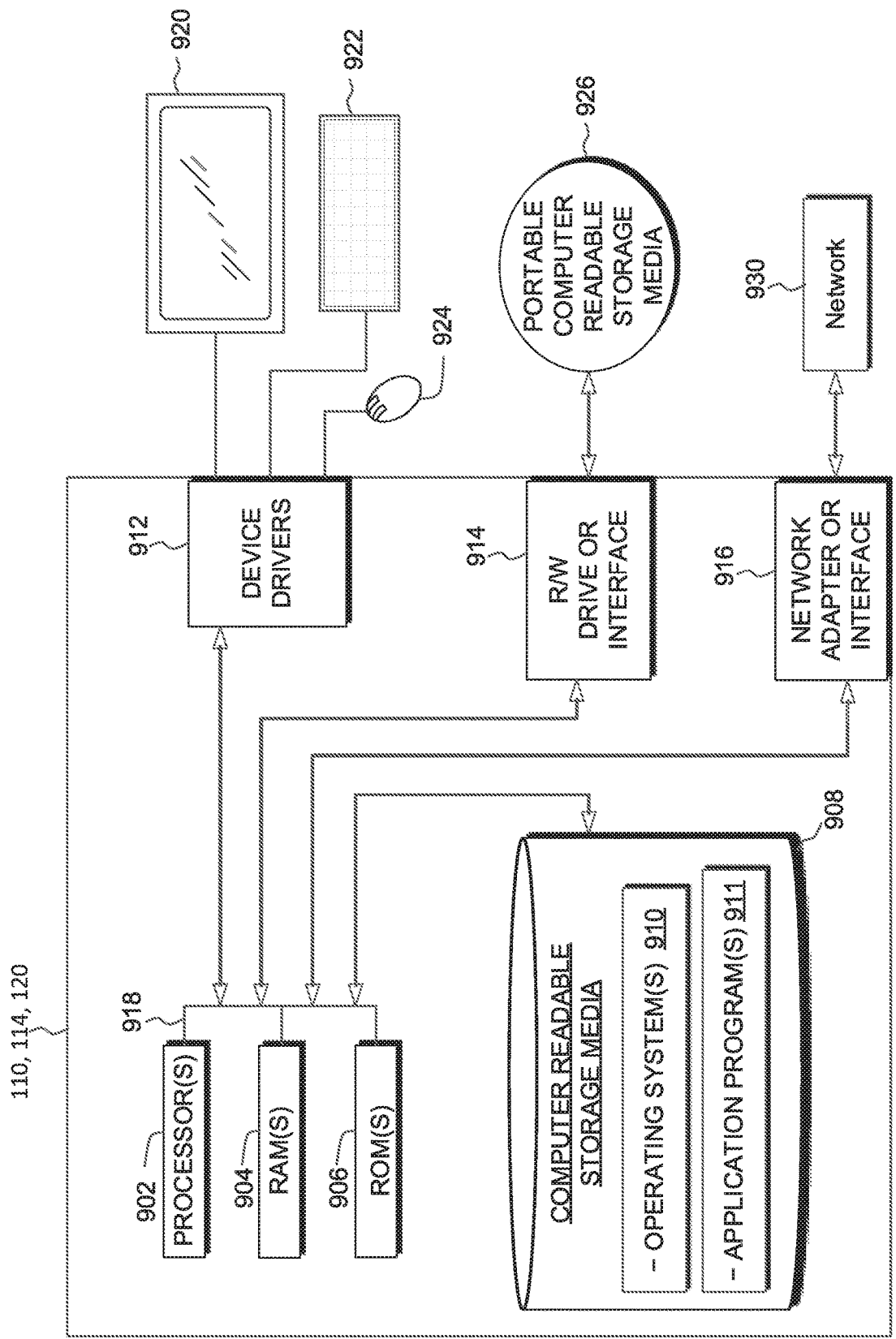
FIG. 3 is a block diagram depicting a user computing device and/or an interpretation management device, in accordance with an embodiment of the present invention.

FIG. 3 is a block diagram depicting user computing device 110 and/or interpretation management device 120, in accordance with an embodiment of the present invention.

As depicted in FIG. 3, user computing device 110 and/or interpretation management device 120 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as optimization program 130 residing on interpretation management device 120, as depicted in FIG. 1, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computing device 110 and/or interpretation management device 120 may also include a R/W drive or interface 914 to read from and write to one or more portable computer readable storage media 926. Application programs 911 on user computing device 110 and/or interpretation management device 120 may be stored on one or more of the portable computer readable storage media 926, read via the respective R/W drive or interface 914 and loaded into the respective computer readable storage media 908. User computing device 110 and/or interpretation management device 120 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the server 220 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. User computing device 110 and/or interpretation management device 120 may also include a display screen 920, a keyboard or keypad 922, and a computer mouse or touchpad 924. In embodiments of the present invention, user computing device 110 may also include the sensor module 212. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may include hardware and software (stored on computer readable storage media 908 and/or ROM 906).

Interpretation management device 120 can be a standalone network server, or represent functionality integrated into one or more network systems. In general, user computing device 110 and/or interpretation management device 120 can be a laptop computer, desktop computer, specialized computer server, or any other computer system known in the art. In certain embodiments, interpretation management device 120 represents computer systems utilizing clustered computers and components to act as a single pool of seamless resources when accessed through a network, such as a LAN, WAN, or a combination of the two. This implementation may be preferred for data centers and for cloud computing applications. In general, user computing device 110 and/or interpretation management device 120 can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
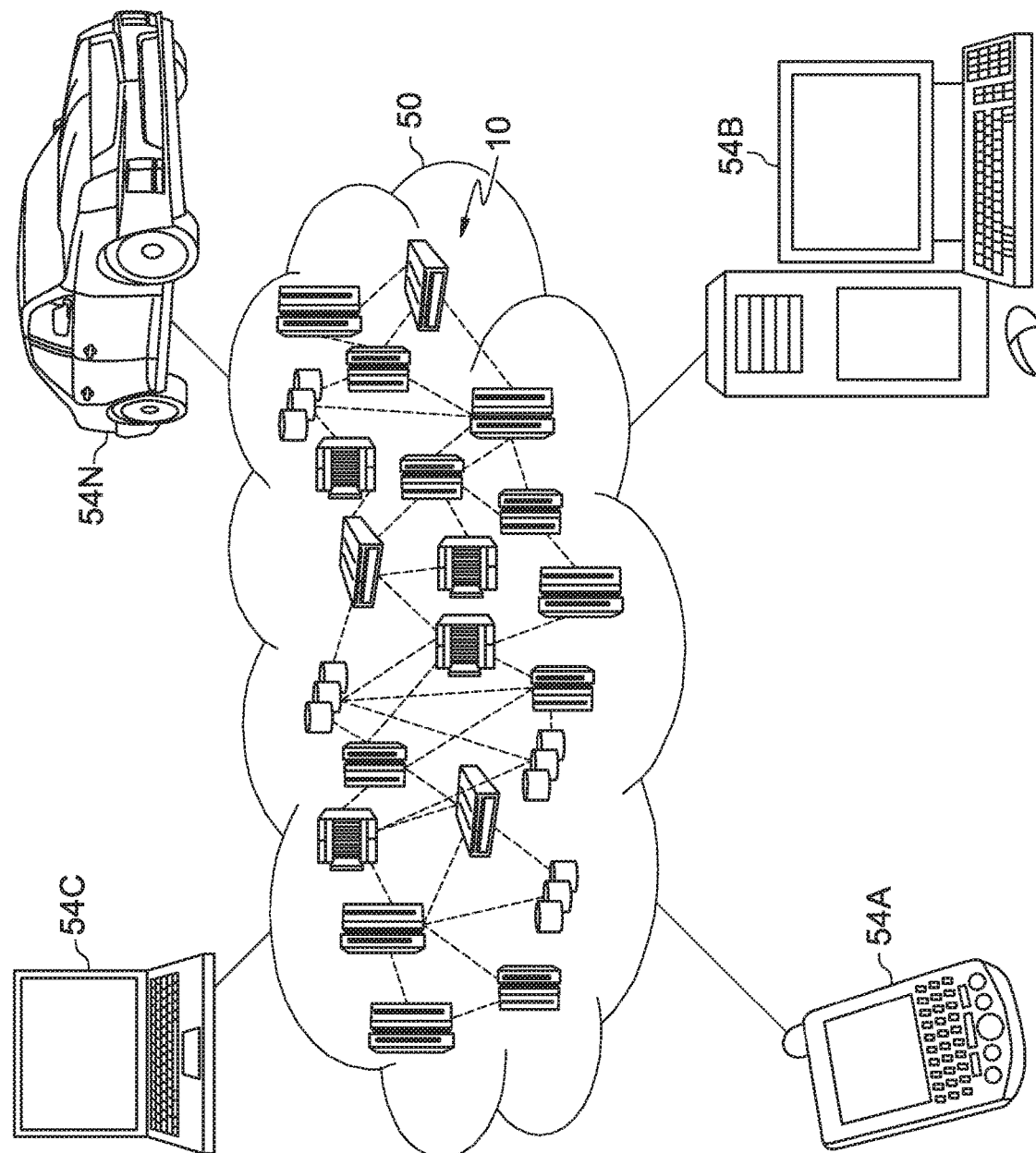
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and solar power forecasting 96. Solar power forecasting 96 may include functionality enabling the cloud computing environment to be used to forecast solar power output by a solar farm, in accordance with embodiments of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A computer-implemented method comprising:
generating weather forecast data with respect to an area encompassing a location of a solar farm;
forecasting solar power output by the solar farm based on the generated weather forecast data and a deep learning model based on a volumetric convolution neural network;
generating forecasted solar power output data based on the forecasted solar power output by the solar farm; and
performing a power grid operation based on the forecasted solar power output data, wherein the power grid operation is selected from a group consisting of a power grid balancing operation and a power grid optimization operation.

2. The computer-implemented method of claim 1, wherein the generated weather forecast data comprises data relating to one or more conditions selected from a group consisting of incident solar irradiance, temperature, humidity, pressure, moisture, wind velocity, cloud coverage, visibility, precipitation type and intensity, and aerosol concentrations.

3. The computer-implemented method of claim 1, wherein the deep learning model is further based on a recurrent neural network.

4. The computer-implemented method of claim 1, wherein the volumetric convolution neural network comprises at least 5 volumetric convolution layers, at least 3 volumetric max pooling layers, and at least 2 fully connected layers.

5. The computer-implemented method of claim 4, wherein each of the at least 5 volumetric convolution layers further comprise a Rectified Linear Units layer.

6. The computer-implemented method of claim 5, wherein the volumetric convolution neural network further comprises an identity skip connection between the layers.

7. A computer system comprising:
one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method comprising:
generating weather forecast data with respect to an area encompassing a location of a solar farm;
forecasting solar power output by the solar farm based on the generated weather forecast data and a deep learning model based on a volumetric convolution neural network;
generating forecasted solar power output data based on the forecasted solar power output by the solar farm; and
performing a power grid operation based on the forecasted solar power output data, wherein the power grid operation is selected from a group consisting of a power grid balancing operation and a power grid optimization operation.

8. The computer system of claim 7, wherein the generated weather forecast data comprises data relating to one or more conditions selected from a group consisting of incident solar irradiance, temperature, humidity, pressure, moisture, wind velocity, cloud coverage, visibility, precipitation type and intensity, and aerosol concentrations.

9. The computer system of claim 7, wherein the deep learning model is further based on a recurrent neural network.

10. The computer system of claim 7, wherein the volumetric convolution neural network comprises at least 5 volumetric convolution layers, at least 3 volumetric max pooling layers, and at least 2 fully connected layers.

11. The computer system of claim 10, wherein each of the at least 5 volumetric convolution layers further comprise a Rectified Linear Units layer.

12. The computer system of claim 11, wherein the volumetric convolution neural network further comprises an identity skip connection between the layers.

13. A computer program product comprising:
One or more non-transitory computer-readable storage devices and program instructions stored on at least one or more non-transitory computer-readable storage devices for execution by at least one or more computer processors of a computer system, the program instructions, when executed by the at least one of the one or more computer processors, causing the computer system to perform a method comprising:
generating weather forecast data with respect to an area encompassing a location of a solar farm;
forecasting solar power output by the solar farm based on the generated weather forecast data and a deep learning model based on a volumetric convolution neural network;
generating forecasted solar power output data based on the forecasted solar power output by the solar farm; and
performing a power grid operation based on the forecasted solar power output data, wherein the power grid operation is selected from a group consisting of a power grid balancing operation and a power grid optimization operation.

14. The computer program product of claim 13, wherein the generated weather forecast data comprises data relating to one or more conditions selected from a group consisting of incident solar irradiance, temperature, humidity, pressure, moisture, wind velocity, cloud coverage, visibility, precipitation type and intensity, and aerosol concentrations.

15. The computer program product of claim 13, wherein the deep learning model is further based on a recurrent neural network.

16. The computer program product of claim 13, wherein the volumetric convolution neural network comprises at least 5 volumetric convolution layers, at least 3 volumetric max pooling layers, and at least 2 fully connected layers.

17. The computer program product of claim 16, wherein each of the at least 5 volumetric convolution layers further comprise a Rectified Linear Units layer.

* * * * *